United States Patent
Krishnamoorthy et al.

(10) Patent No.: US 11,757,846 B2
(45) Date of Patent: Sep. 12, 2023

(54) COGNITIVE MULTI-ENCRYPTED MAIL PLATFORM

(71) Applicant: Bank of America Corporation, Charlotte, NC (US)

(72) Inventors: MadhuSudhanan Krishnamoorthy, Chennai (IN); Ganesh Balasubramanian, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 16/911,949

(22) Filed: Jun. 25, 2020

(65) Prior Publication Data
US 2021/0409380 A1    Dec. 30, 2021

(51) Int. Cl.
*H04L 9/40*     (2022.01)
*G06F 3/0482*   (2013.01)
*H04L 51/42*    (2022.01)

(52) U.S. Cl.
CPC ........ *H04L 63/0428* (2013.01); *G06F 3/0482* (2013.01); *H04L 51/42* (2022.05); *H04L 63/0435* (2013.01); *H04L 63/065* (2013.01)

(58) Field of Classification Search
CPC ... G06F 3/0482; H04L 63/0428; H04L 51/42; H04L 63/0435; H04L 63/065; H04L 63/0478
See application file for complete search history.

(56) References Cited

U.S. PATENT DOCUMENTS

| | | |
|---|---|---|
| 6,396,928 B1 | 5/2002 | Zheng |
| 6,912,285 B2 | 6/2005 | Jevans |
| 7,277,549 B2 | 10/2007 | Olkin et al. |
| 7,293,171 B2 | 11/2007 | Batthish et al. |
| 7,493,661 B2 | 2/2009 | Liu et al. |
| 7,698,558 B2 | 4/2010 | Tomkow |
| 8,009,829 B2 | 8/2011 | Jueneman et al. |
| 8,077,870 B2 | 12/2011 | Wack et al. |
| 8,126,139 B2 | 2/2012 | Rose et al. |
| 8,353,023 B2 | 1/2013 | Spies et al. |
| 8,468,244 B2 | 6/2013 | Redlich et al. |
| 8,489,877 B2 | 7/2013 | Ivanov et al. |
| 8,521,821 B2 | 8/2013 | van der Horst et al. |
| 8,526,618 B2 | 9/2013 | Little et al. |
| 8,532,300 B1 | 9/2013 | Searles |

(Continued)

OTHER PUBLICATIONS

U.S. Appl. No. 16/912,015, filed Jun. 25, 2020, Krishnamoorthy et al.

(Continued)

*Primary Examiner* — Dino Kujundzic

(57) ABSTRACT

An apparatus configured to construct an email message addressed to a plurality of recipients. The apparatus is further configured to apply a cipher and a first encryption key to a first portion of the email message, which will be viewable by each of the recipients. The apparatus applies the cipher and a second encryption key to a second portion of the email message, which will be viewable by a first recipient from among the recipients. The apparatus further applies the cipher and a third encryption key to a third portion of the mail message, which will be viewable by a second recipient from among the recipients. The apparatus then transmits the email message to a server.

20 Claims, 8 Drawing Sheets

(56) References Cited

U.S. PATENT DOCUMENTS

| | | |
|---|---|---|
| 8,538,028 B2 | 9/2013 | Yeap et al. |
| 8,626,852 B2 | 1/2014 | Keohane et al. |
| 8,650,258 B2 | 2/2014 | Brown et al. |
| 8,681,975 B2 | 3/2014 | Farrugia et al. |
| 8,688,790 B2 | 4/2014 | LeVasseur et al. |
| 8,824,684 B2 | 9/2014 | Calcaterra et al. |
| 8,837,738 B2 | 9/2014 | Huang et al. |
| 8,837,739 B1 | 9/2014 | Sexton et al. |
| 8,954,513 B2 | 2/2015 | Nutkis |
| 9,002,018 B2 | 4/2015 | Wilkins et al. |
| 9,173,529 B2 | 10/2015 | Zaverucha |
| 9,189,775 B2 * | 11/2015 | DeLuca ............... G06Q 10/107 |
| 9,356,779 B2 | 5/2016 | Boneh et al. |
| 9,401,900 B2 | 7/2016 | LeVasseur et al. |
| 9,679,118 B2 | 6/2017 | Sitrick et al. |
| 9,819,647 B2 | 11/2017 | Reddy et al. |
| 10,033,702 B2 | 7/2018 | Ford et al. |
| 10,129,197 B2 * | 11/2018 | Liberty ................... H04L 51/42 |
| 10,313,135 B2 | 6/2019 | Lord et al. |
| 10,356,095 B2 | 7/2019 | Meyer |
| 10,511,579 B2 | 12/2019 | Freeman et al. |
| 10,628,597 B2 | 4/2020 | Berger et al. |
| 10,652,015 B2 | 5/2020 | Le Saint et al. |
| 11,122,021 B1 * | 9/2021 | Krishnamoorthy ......................... H04L 63/0457 |
| 11,451,389 B2 * | 9/2022 | Krishnamoorthy ..... H04L 9/088 |
| 2005/0108351 A1 * | 5/2005 | Naick .................. G06Q 10/107 709/207 |
| 2008/0298596 A1 * | 12/2008 | Kuraki ..................... G09C 5/00 380/283 |
| 2009/0144565 A1 | 6/2009 | Peterson |
| 2010/0275021 A1 * | 10/2010 | Kristiansen ............. H04L 9/088 713/168 |
| 2011/0113109 A1 * | 5/2011 | LeVasseur ............ H04L 51/212 709/206 |
| 2012/0023571 A1 * | 1/2012 | Spies .................... H04L 9/3073 380/278 |
| 2014/0025802 A1 | 1/2014 | Bonar et al. |
| 2014/0304508 A1 | 10/2014 | Murphy et al. |
| 2015/0371611 A1 | 12/2015 | Raley et al. |
| 2016/0191472 A1 * | 6/2016 | Ghafourifar ............ H04L 9/088 713/167 |
| 2016/0226844 A1 | 8/2016 | Pecka et al. |
| 2017/0139843 A1 | 5/2017 | Resch |
| 2017/0155509 A1 | 6/2017 | Sitrick et al. |
| 2018/0219821 A1 | 8/2018 | Murphy et al. |
| 2018/0248691 A1 | 8/2018 | Henderson et al. |
| 2019/0068558 A1 * | 2/2019 | Jindal ...................... H04L 9/14 |
| 2020/0074105 A1 * | 3/2020 | Gordon ............... G06F 21/6227 |
| 2020/0099667 A1 * | 3/2020 | Parthasarathy ....... H04L 9/3213 |

OTHER PUBLICATIONS

U.S. Appl. No. 16/912,069, filed Jun. 25, 2020, Krishnamoorthy et al.

* cited by examiner

COGNITIVE MULTI-ENCRYPTED MAIL PLATFORM

TECHNICAL FIELD

This disclosure relates generally to encrypted communications. More specifically, this disclosure relates to a cognitive multi-encrypted mail platform.

BACKGROUND

The internet has enabled people to collaborate digitally across the globe. Optimal performance in a remote work setting is predicated on effective communication. Often, a team leader needs to communicate with a variety of stakeholders. Currently, email is the preferred platform for conducting such communications. The current email formats present several technical challenges that limit their application and require duplicitous computations by the processor. Emails are either encrypted at the content level or designated as public at the current level. Thus, every recipient included on the email will be able to see the entire email message. This means that you must start multiple email threads if you want to limit who can read portions of your message. This consumes additional memory on network servers, and it requires extra processing bandwidth.

SUMMARY OF THE DISCLOSURE

According to one embodiment, an apparatus generates an encrypted email message. The apparatus includes a memory and a processor. The memory stores a first symmetric encryption key that is unique to a first class of users. The memory also stores a second symmetric encryption key that is unique to a second class of users. The second class of users is a subset of the first class of users. The memory further stores a third symmetric encryption key that is unique to a third class of users. The third class of users is a subset of the first class of users that is different from the second class of users. The processor is configured to construct an email message that is addressed to a plurality of recipients. The email message includes a first portion of the message that is designated as viewable by each of the recipients. Each of the recipients is in the first class of users. The email message also includes a second portion of the message that is designated to only be viewable by a first recipient from among the plurality of recipients. The first recipient is in the second class of users. The email message further includes a third portion of the message that is designated to only be viewable by a second recipient from among the plurality of recipients. The second recipient is in the third class of users. The processor then applies a cipher, using the first encryption key, to the first portion of the message to generate a first encrypted portion of the email message. The processor applies the same cipher, using the second encryption key, to the second portion of the message to generate a second encrypted portion of the email message. The processor applies the same cipher, using the third encryption key, to the third portion of the message to generate a third encrypted portion of the email message. The email is then transmitted to a server for further processing.

The apparatus disclosed in the present application provides a technical solution to the technical problems discussed above by generating an email message with varied levels of encryption within the content of the message. The system and apparatus described in this disclosure may be integrated into a practical application of an email client and server that can determine which portions of an email message are intended for which recipients. The client and server may then encrypt individual portions of the email message using keys that are unique to one or more of the intended recipients. The multi-encrypted text may be incorporated into a single HTML email that may be processed by a mail server for ultimate distribution to the intended recipients. The novel single-email, multi-encryption format provides several technical advantages: (1) it allows a user to maintain a unified message thread while controlling how much information is available to each recipient in the thread; (2) it uses a smaller amount of computer memory, which improves operating speeds; (3) it reduces bottlenecks in the network because fewer individual emails must be sent, which in turn decreases the load on network infrastructure; and (4) it provides a more manageable record of communications.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, existing technology for sending and receiving emails between a team of people requires starting multiple email threads if you want different people on the team to be able to view different information. The embodiments described in the illustrative examples of FIGS. 1-8 below facilitate more efficient means of communication through a process of multi-encrypted message threads. For example, the inventions contemplated by the present disclosure reduce the number of separate emails that have to be sent, which in turn reduces bottlenecks in the network and eases the burden on processors and telecommunications equipment (e.g., routers, switches, and email servers) in the network. The proposed apparatuses and methods disclosed below detail the generation of multi-encrypted emails, the server-side processing of multi-encrypted email messages before delivery to their intended recipient, and the generation of reply messages in the multi-encrypted format.

System Overview

Figure 1:
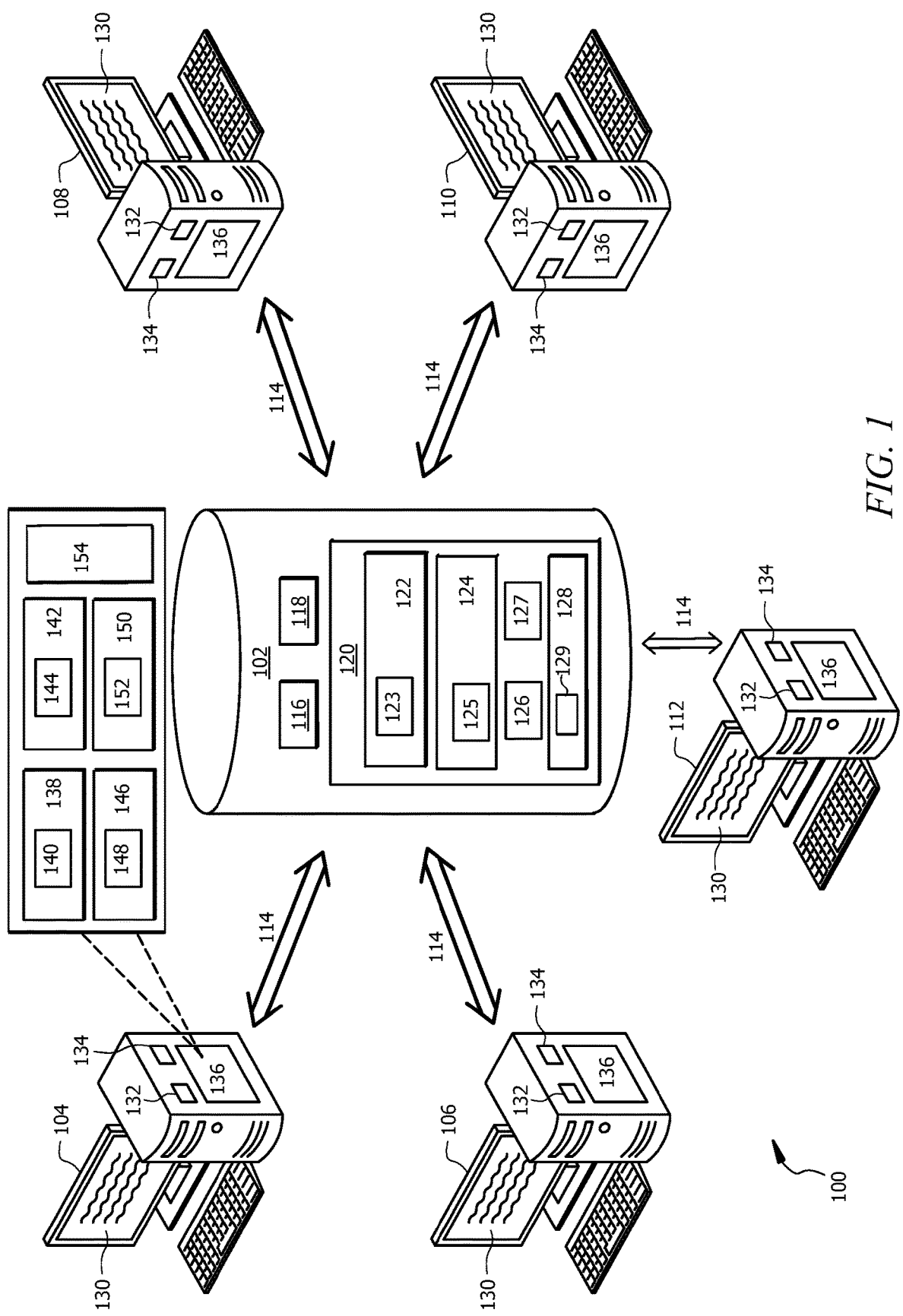
FIG. 1 is a schematic diagram of an embodiment of a system for generating and handling multi-encrypted email messages.

FIG. 1 is a schematic diagram of an embodiment of a system for generating and handling multi-encrypted email messages. The example system 100 describes an operating environment for several apparatuses whose operation is detailed in FIGS. 3-8. The system 100 comprises a mail server 102, user device 104, user device 106, user device 108, user device 110, and user device 112. The mail server 102 is in communication with the user devices 104-112 via network 114. Network 114 is any suitable type of network operable to support communication between users and components (e.g., user devices 102-112 and mail server 102) of the system 100. The network 114 may include all or a portion of the Internet, a public switched telephone network (PSTN), a public network, a private network, a local area network (LAN), a metropolitan area network (MAN), a wide area network (WAN), or any other suitable type of network. The network 114 may be configured to support any suitable type of communication protocol as would be appreciated by one of ordinary skill in the art upon viewing this disclosure.

The mail server 102 includes a network interface 116, a processor 118, and a memory 120. The network interface 116 is configured to enable wired and/or wireless communications. The network interface 116 is configured to communicate data between mail server 102 and user devices 104-112 in the system 100 and/or any other system or domain. For example, the network interface 116 may comprise a WIFI interface, a local area network (LAN) interface, a wide area network (WAN) interface, a modem, a switch, or a router. The processor 118 is configured to send and receive data using the network interface 116. The network interface 116 may be configured to use any suitable type of communication protocol as would be appreciated by one of ordinary skill in the art.

The processor 118 comprises one or more processors operably coupled to the memory 120. The processor 118 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 118 may be a programmable logic device, a microcontroller, a microprocessor, or any suitable combination of the preceding. The processor 118 is communicatively coupled to and in signal communication with the memory 120. The one or more processors are configured to process data and may be implemented in hardware or software. For example, the processor 118 may be 8-bit, 16-bit, 32-bit, 64-bit or of any other suitable architecture. The processor 118 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions 123 to implement a message segregation engine 122. The one or more processors are further configured to execute instructions 125 to implement a text encryption engine 124. Additionally, the one or more processors are configured to execute instructions 129 to implement an email distribution engine 128. In this way, processor 118 may be a special-purpose computer designed to implement the functions disclosed herein. In an embodiment, the message segregation engine 122, text encryption engine 124, and email distribution engine 128 are each implemented using logic units, FPGAs, ASICs, DSPs, or any other suitable hardware.

Figure 5:
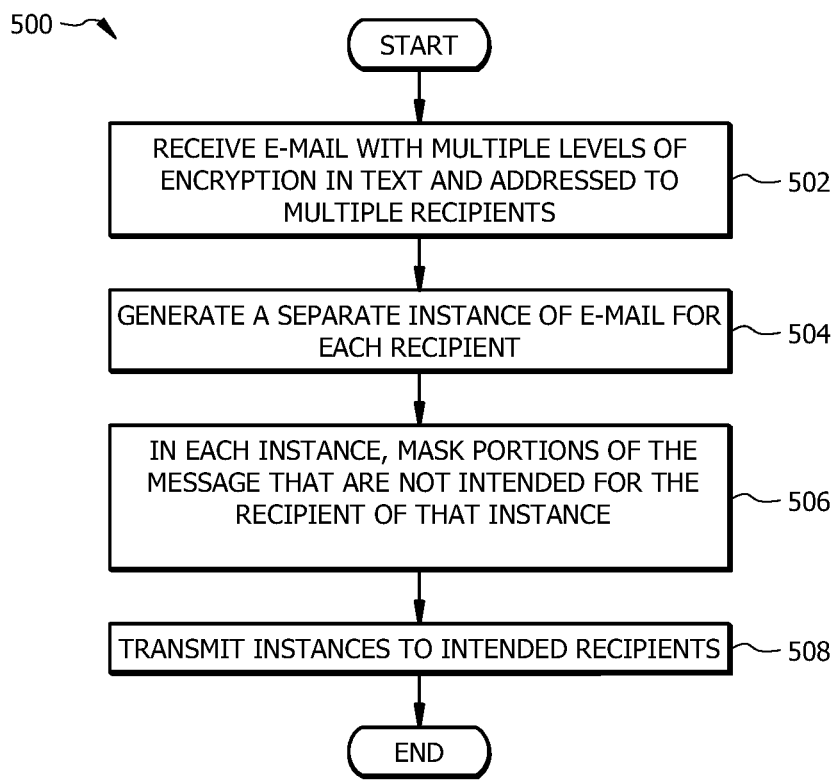
FIG. 5 is a flowchart of an embodiment of a method for handling multi-encrypted email messages.
Figure 6:
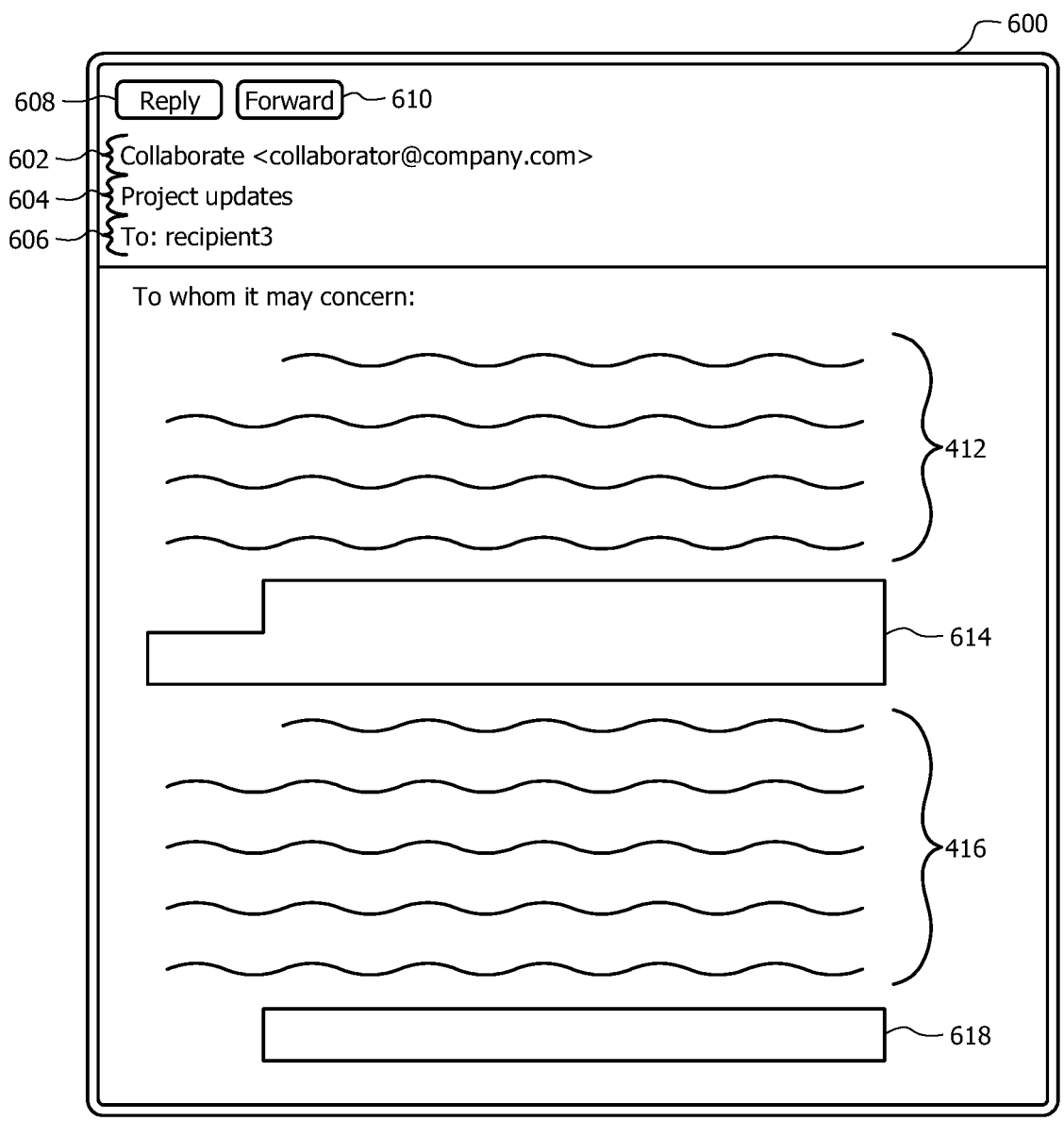
FIG. 6 is an embodiment of a received multi-encrypted email message.

The message segregation engine 122, text encryption engine 124, and email distribution engine 128 are described in FIGS. 5-6. For example, the message segregation engine 122, text encryption engine 124, and email distribution engine 128 may be configured to perform steps of the method 500 described in FIG. 5.

The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise read-only memory (ROM), random-access memory (RAM), ternary content-addressable memory (TCAM), dynamic random-access memory (DRAM), and static random-access memory (SRAM). The memory 120 is operable to store message segregation engine 122, including instructions 123; text encryption engine 124, including instructions 125; masking rules 126; encryption keys 127, and email distribution engine 128, including instructions 129. The instructions 123, 125, and 129 are any suitable set of instructions, logic, rules, or code that when executed by processor 118 implement the message segregation engine 122, text encryption engine 124, and email distribution engine 128, respectively. The masking instructions 126 and encryption keys 127 are described in further detail with respect to FIG. 5.

User devices 104-112 represent any suitable computing device that can send and receive emails. The user devices 104-112 generally comprise a display 130 capable of displaying text to a user, a network interface 132, a processor 134, and a memory 136. While the user devices 104-112 are illustrated as a desktop computer in FIG. 1, one of ordinary skill in the art will appreciate that the user devices 104-112 may be a mobile phone, a laptop, a tablet computer, a personal digital assistant, or any similar device. The display 130 may be a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure.

The network interface 132 is configured to enable wired and/or wireless communications. The network interface 132 is configured to communicate data between the user devices 104-112 and the mail server 102 and/or any other system or domain. For example, the network interface 132 may comprise a WIFI interface, a local area network (LAN) interface, a wide area network (WAN) interface, a modem, a switch, or a router. The processor 134 is configured to send and receive data using the network interface 132. The network interface 132 may be configured to use any suitable type of communication protocol as would be appreciated by one of ordinary skill in the art.

The processor 134 comprises one or more processors operably coupled to the memory 136. The processor 134 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 134 may be a programmable logic device, a microcontroller, a microprocessor, or any suitable combination of the preceding. The processor 134 is communicatively coupled to and in signal communication with the memory 136. The one or more processors are configured to process data and may be implemented in hardware or software. For example, the processor 134 may be 8-bit, 16-bit, 32-bit, 64-bit or of any other suitable architecture. The processor 134 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions 140 to implement a multi-encryption engine 138. They are further configured to execute instructions 144 to implement a response engine 142. They are also configured to execute instructions 148 to implement an email client 146. They are also configured to execute instructions 152 to implement an encryption mapping engine 150. In this way, processor 134 may be a special-purpose computer designed to implement the functions disclosed herein. In an embodiment, the multi-encryption engine 138, response engine 142, email client 146, and encryption mapping engine 150 are each implemented using logic units, FPGAs, ASICs, DSPs, or any other suitable hardware.

Figure 3:
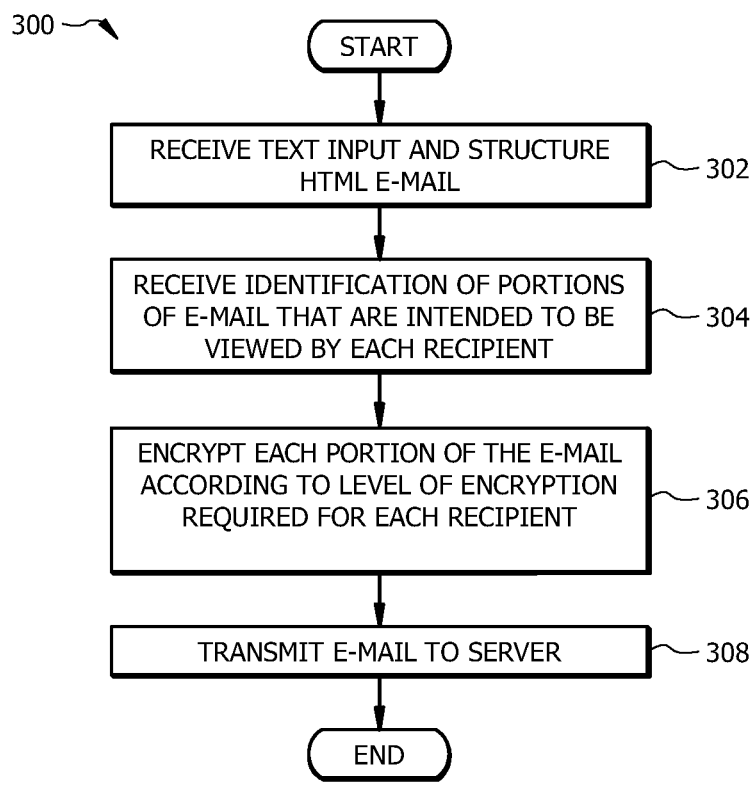
FIG. 3 is a flowchart of an embodiment of a method for generating a multi-encrypted email message.
Figure 4:
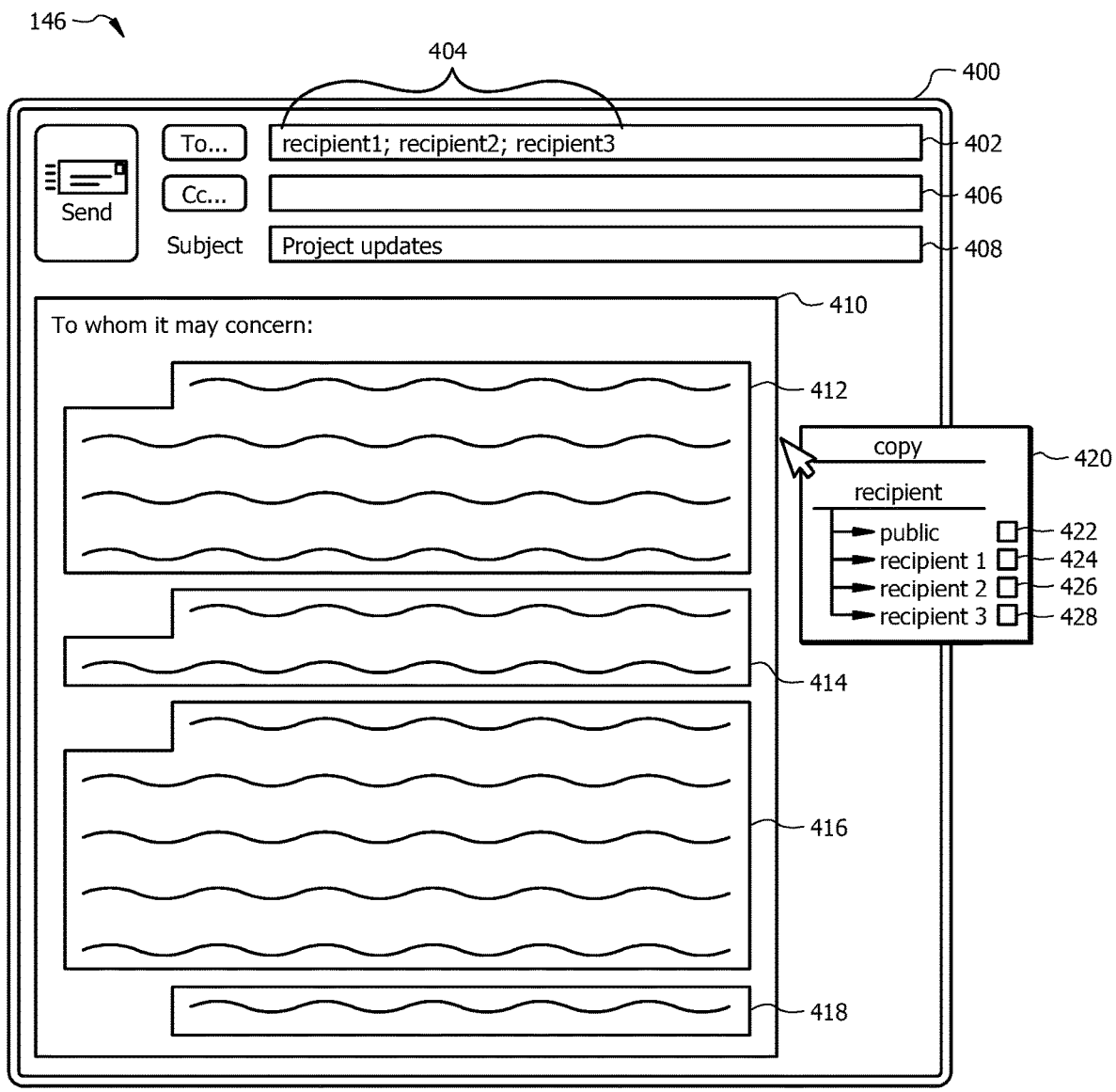
FIG. 4 is an embodiment of an interface for generating a multi-encrypted email message.

The multi-encryption engine 138 is described in FIGS. 3-4. The response engine 142 is described in FIGS. 6-8. The email client 146 is described in FIGS. 3-4 & 6-8. The encryption mapping engine 150 is described in FIGS. 6-7.

The memory 136 comprises one or more disks, tape drives, or solid-state drives, and may be used as an over-flow data storage device, to store programs when such programs are selected for execution, and to store instructions and data that are read during program execution. The memory 136 may be volatile or non-volatile and may comprise read-only memory (ROM), random-access memory (RAM), ternary content-addressable memory (TCAM), dynamic random-access memory (DRAM), and static random-access memory (SRAM). The memory 136 is operable to store instructions 140, 144, 148, and 152. The instructions 140, 144, 148, and 152 may comprise any suitable set of instructions, logic, rules, or code that when executed by processor 134 implement the multi-encryption engine 138, response engine 142, email client 146, and encryption mapping engine 150, respectively. The memory 136 is further operable to store one or more encryption keys 154. The encryption keys 154 may be used to encrypt and decrypt portions of email messages. Additional detail about the encryption keys 154 is provided in FIGS. 3 & 7.

Figure 2:
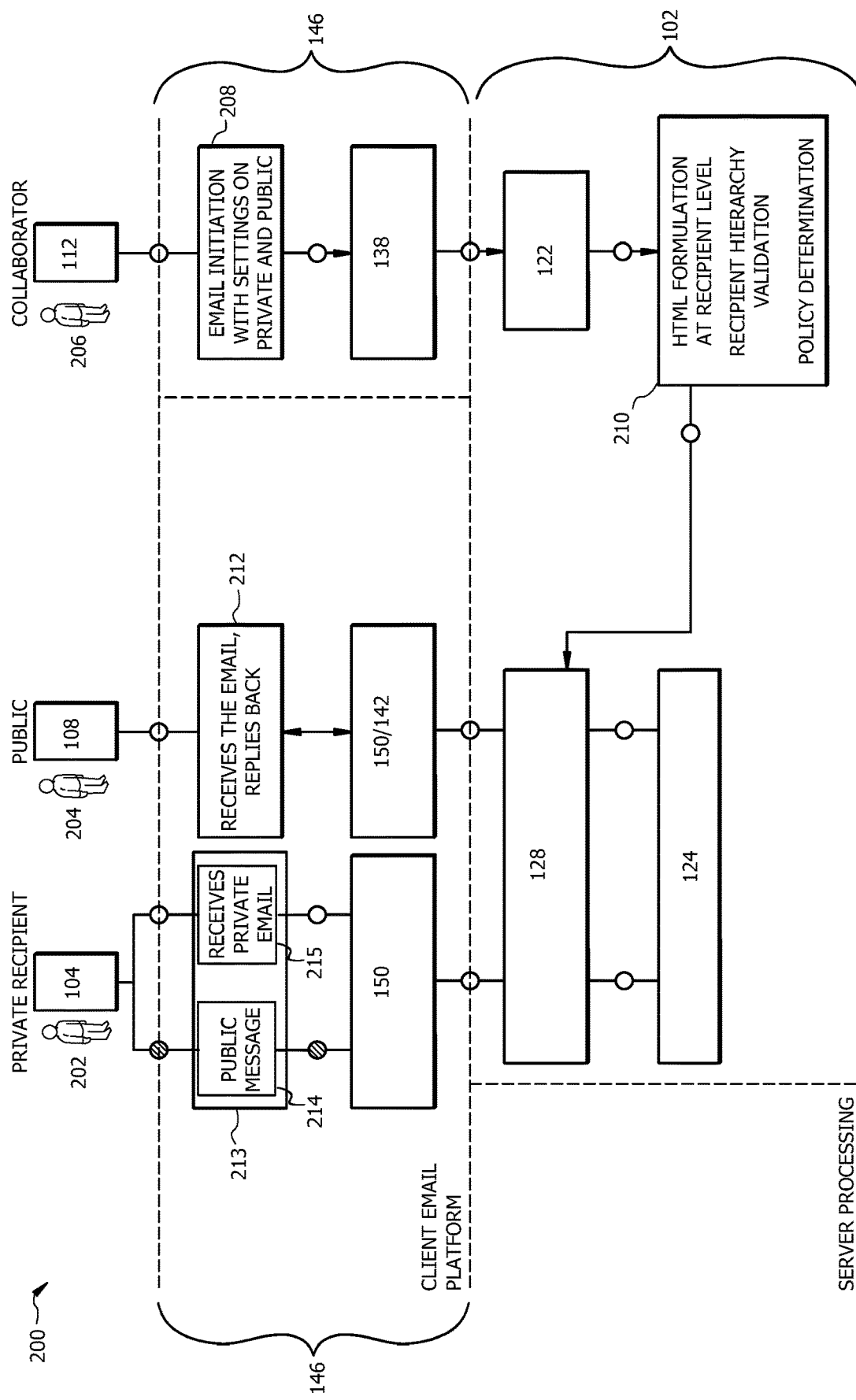
FIG. 2 is a workflow diagram of a sample use case for the system illustrated in FIG. 1.

FIG. 2 illustrates a workflow diagram of a sample use case for the system illustrated in FIG. 1. The workflow 200 is illustrated as it would occur through the interface of a mail server 102 and an email client 146. Specific user devices 104-112 are depicted as being associated with a collaborator (i.e., the individual initiating a thread of multi-encrypted email messages) or a public or private recipient (i.e. recipients of a multi-encrypted email message with access to specific levels of encrypted information in a multi-encrypted message). For example, user device 104 may be associated with a private recipient 202, user device 108 may be associated with a public recipient 204, and user device 112 may be associated with a collaborator 206. The workflow 200 begins at step 208 where the collaborator 206 uses device 112 to draft an email message addressed to private recipient 202 and public recipient 204. The collaborator 206 designates certain portions of the email message to have a public encryption level, whereby all recipients may view it upon receipt, and certain portions of the email message to have a private encryption level, whereby only specific recipients (in this case private recipient 202) may view it upon receipt. This email message is drafted using the email client 146. The email client 146 then applies the appropriate level of encryption to each portion of the message using the multi-encryption engine 138. Details about the operation of multi-encryption engine 138 are provided in the discussions of FIGS. 3 & 4.

The next phase of workflow 200 occurs at the mail server 102. Once the mail server 102 receives a multi-encrypted message, the segregation engine 122 determines which portions of the message are intended for which recipient. Then, at step 210, the mail server 102 generates individualized instances of the received email message to send to the private recipient 202 and public recipient 204. This involves formulating individual HTML messages, validating that the instance of the message is addressed to the correct recipient, and determining the proper masking policy for obscuring portions of the message that a recipient is not supposed to view.

The text encryption engine 124 applies the appropriate type of masking based on the intended recipient. The masking policy is determined based on the masking rules 126. Assume that the email message drafted by collaborator 206 contains two paragraphs of text. The collaborator 206 assigned a public level of encryption to the first paragraph and a private level of encryption to the second paragraph. Once the single email with two levels of encryption is received by the mail server 102, the segregation engine 122 will create two copies of the email, one that is addressed to private recipient 202 and one addressed to public recipient 204. The text encryption engine 124 determines that, according to the masking rules 126, no masking is required for text that has a public level of encryption. Thus, the first paragraph in both instances will not be masked. The text encryption engine 124 determines that public user 108 does not have permission to view text of a private encryption level, so it will mask the second paragraph, according to the masking rules 126, in the instance of the email addressed to the public recipient 204. The instance of the email addressed to the private recipient 202 will not contain any masking because private recipient 202 has the appropriate privileges to view portions of messages that are both private- or public-level encrypted. The email distribution engine 128 then transmits the masked instances to the intended recipients, in this case private recipient 202 and public recipient 204. More detail about the operations of the mail server 102 are provided below with respect to FIGS. 5 & 6.

The workflow 200 continues when the private recipient 202 and public recipient 204 receive their instances of the email message sent by collaborator 206. The remaining portions of the workflow 200 are performed by the email client 146, this time from the user devices 104 and 108. The encryption mapping engine 150 is used to determine which encryption keys are necessary to decrypt the multi-encrypted message. Once decrypted, private recipient 202 may view the public message 214 and private message 215 in a single email at step 213. Public recipient 204 may view the public message at step 212. In the example workflow 200, public recipient 204 decides to reply to the public message. Step 212 also involves creating a reply message to be sent back to collaborator 206. User 204 designates portions of the reply message as being responsive to portions of the message received from collaborator 206. The encryption mapping engine 150 then determines the appropriate level of encryption to apply to each section of the reply message based on these designations. Finally, the response engine 142 applies the multiple encryption levels to the message and transmits the reply to mail server 102 for further processing and distribution. Additional details about the receipt of and reply to multi-encrypted email message are provided below with respect to FIGS. 6-8.

Multi-Encrypted Message Generation

FIG. 3 is a flowchart of an embodiment of a method 300 for generating a multi-encrypted email message. The method 300 is best understood in conjunction with FIG. 4, which illustrates an embodiment of an interface for generating a multi-encrypted email message. The method 300 in FIG. 3 begins at step 302 where an email client 146 receives text input and structures it into an HTML email. Other formats (e.g., plain text and rich text) may be used. For example, FIG. 4 illustrates how the email client 146 may generate an email 400. The email 400 includes "To" field 402 where the user may input the email address of any recipients 404. The email 400 also includes a "carbon copy" field 406 where the user may input the email address for any recipients to which the user also wants to send a copy of the email. Email 400 further includes a subject field 408. Finally, email 400 includes a text field 410 where the user may draft its message. In this example, the text field 410 comprises paragraphs 412, 414, 416, and 418.

Returning to FIG. 3, the method 300 proceeds to step 304 where the user identifies which portions of the email are intended to be viewed by which recipient. FIG. 4 illustrates how this might be accomplished. The user may access a drop-down menu 420 by right clicking on a highlighted portion of text in the text field 410. The drop-down menu 420 then provides several options to the user. The user may select one of the selectable option fields 422-428 to designate the intended recipient for that portion of text. The designations made at this step will determine the level of encryption to be applied to that portion of the email. For example, the user may designate paragraph 412 as intended for the public (i.e., all the recipients listed in field 402) by highlighting paragraph 412, right clicking on the highlighted text, and selecting option field 422 from the drop-down menu 420. The user may designate paragraph 414 as intended for "recipient 1" by highlighting paragraph 414, right clicking on the highlighted text, and selecting option field 424. The user may further designate paragraph 416 as intended for "recipient 3" by highlighting paragraph 416, right clicking on the highlighted text, and selecting option field 428. The user may then designate paragraph 418 as intended for "recipient 2" by highlighting paragraph 418, right clicking on the highlighted text, and selecting option field 426. While in this example each paragraph is only assigned to one type of recipient, it is possible to select multiple classes of recipients by selecting more than one of the option fields 422-428. Additionally, while the selectable option fields 422-428 include the names of the individual recipients, it may be configured to display the names of recipient groups.

One of ordinary skill in the art will appreciate that other means of assigning portions of the email to different recipients are possible. For example, keyboard shortcuts can be configured so that pressing a key before and after typing a portion of text will assign that portion of text to a specific recipient or group of recipients. Speech recognition can be used to assign portions of the email message to specific recipients or a group of recipients by using voice commands. Highlighting tools may be used to assign portions of text to specific recipients without having to select the recipient's name from a menu.

After a portion of the email message is designated for viewing by a certain recipient or group of recipients, the email 400 may alter the display of the text within the text field 410 to provide a visual indication of which portions of the message have been designated for receipt by specific recipients or groups of recipients. For example, the text might be highlighted, or it might be displayed using a different format. The different format may comprise a different font, a different text color, a different text size, or any combination thereof.

Returning to FIG. 3, the method 300 proceeds to step 306 where the multi-encryption engine 138 encrypts each portion of the email 400 according to the designations made at step 304. Each recipient or group of recipients represents a different level of encryption. In the example of FIG. 4 described above, there are different encryption keys 127 for the public classification (option 422), "recipient 1" (option 424), "recipient 2" (option 426), and "recipient 3" (option 428). The encryption keys 127 in this example are symmetrical, but the disclosed system and apparatuses may use asymmetrical key pairs. The multi-encryption engine 138 applies a cipher and the appropriate encryption key 127 to each portion of the message in email 400 to produce a multi-encrypted email. The cipher used by multi-encryption engine 138 may be any reciprocal cipher. For example, the cipher may be a block cipher or a stream cipher. In particular, the cipher may be ChaCha, RC4, A5/1, A5/2, Chameleon, FISH, Helix, ISAAC, MUGI, Panama, Phelix, Pike, Salsa20, SEAL, SOBER, SOBER-128, WAKE, Lucifer, DES, IDEA, RC5, Rijendael, AES, Blowfish, or any similar ciphers capable of use in email encryption.

This process can be visualized using the example of FIG. 4. Because the user designated paragraph 412 as public at step 304, the multi-encryption engine 138 selects the encryption key 127 having the public classification and uses it with the cipher to create a first encrypted portion (comprising paragraph 412) of the email 400. Because the user designated paragraph 414 to be readable by "recipient 1" at step 304, the multi-encryption engine 138 selects the encryption key 127 associated with "recipient 1" and uses it with the cipher to create a second encrypted portion (comprising paragraph 414) of the email 400. Because the user designated paragraph 416 to be readable by "recipient 3" at step 304, the multi-encryption engine 138 selects the encryption key 127 associated with "recipient 3" and uses it with the cipher to create a third encrypted portion (comprising paragraph 416) of the email 400. Because the user designated paragraph 418 to be readable by "recipient 2" at step 304, the multi-encryption engine 138 selects the encryption key 127 associated with "recipient 2" and uses it with the cipher to create a fourth encrypted portion (comprising paragraph 418) of the email 400. This results in a single email 400 with different levels of encryption in different portions of the message.

Referring back to FIG. 3, the method 300 proceeds to step 308 where the email client 146 transmits the multi-encrypted email generated at step 306 to a mail server 102. The mail server 102 is then responsible for distribution to the intended recipients.

Mail Server Handling of Multi-Encrypted Messages

FIG. 5 is a flowchart of an embodiment of a method 500 for handling multi-encrypted email messages. The method 500 starts at step 502 where the mail server 102 receives an email with multiple levels of encryption in various portions of the message that is addressed to multiple recipients. For example, this may be the multi-encrypted email generated at step 306 of method 300 described above. In that example, the email 400 had four levels of encryption and was addressed to three recipients. Successive steps of the method 500 will be explained using this example, but other formats of multi-encryption messages can be processed using the method 500.

At step 504, the message segregation engine 122 generates separate instances of the received email. Because there are three recipients in this example, segregation engine 122 generates three instances of the multi-encrypted email. Each instance of the email is addressed to one of the recipients. Each instance contains the same information and the same levels of encryption.

Next, at step 506, masking is applied to portions of the message in each instance by the text encryption engine 124. The masking step obscures or removes information from a recipient's instance of the email when that recipient was not intended to see the information. The appropriate level of masking is determined by reference to the masking rules 126. In the example email 400, paragraph 412 was encrypted at a public level intended to allow all recipients to see it. Thus, no masking would be applied to paragraph 412 in any of the instances of the email. Paragraph 414 was encrypted for viewing by recipient 1, so paragraph 414 would be masked in the instances of the email addressed to "recipients 2 and 3". Paragraph 416 was encrypted for viewing by "recipient 3", so paragraph 416 would be masked in the instances of the email addressed to recipients 1 and 2. Paragraph 418 was encrypted for viewing by "recipient 2", so paragraph 418 would be masked in the instances of the email addressed to "recipients 1 and 3".

FIG. 6 illustrates what a masked instance of the email would look like to the recipient. The email 600 is an instance of the email 400 that is addressed to recipient 3. The email 600 provides an indication 602 of who sent the email, a subject line 604, and a recipient list 606. The recipient list 606 may be configured to show all the recipients in the thread or only the immediate recipient of the email 600. Here, only the recipient of this instance is listed in the recipient list 606. The email 600 also includes a reply button 608 and forward button 610. These buttons function similarly to normal emails, with some distinctions discussed below in FIGS. 7-8.

The body of the email 600 comprises the same paragraphs 412 and 416 as were in the original email received by mail server 102. However, in place of paragraphs 414 and 418 there are redacted portions 614 and 618. The redacted portions 614 and 618 may be blurred versions of the original paragraph. The redacted portions 614 and 618 may alternatively comprise black redaction bars where the original paragraphs would have been located. Alternative embodiments may omit the redacted portions 614 and 618 altogether so that only the paragraphs 412 and 416 would be visible. The type of masking applied may be selected by the user before the email 400 is sent to the mail server 102. In some embodiments, the system may randomly select a form of masking. The masking technique selected may be the same for each instance, or different recipients may receive different masking in their instance based on the preference of the user.

Returning to FIG. 5, the method 500 proceeds to step 508 where the email distribution engine 128 transmits the instances to their intended recipients. Transmission by the email distribution engine 128 starts the thread tracked by the mail server 102. The mail server maintains a list of the recipients of the initial email along with the levels of encryption that were applied to portions of the email. When recipients reply to their instance, the email distribution engine 128 tracks which portion of the email to which that recipient is responding. It then uses this to maintain an individualized thread for each party. The initiator of the thread (i.e., the sender of email 400) may be able to see all the traffic generated under the thread while each recipient will only be able to see those portions to which they were granted privileges to view.

Reply Message Generation

Figure 7:
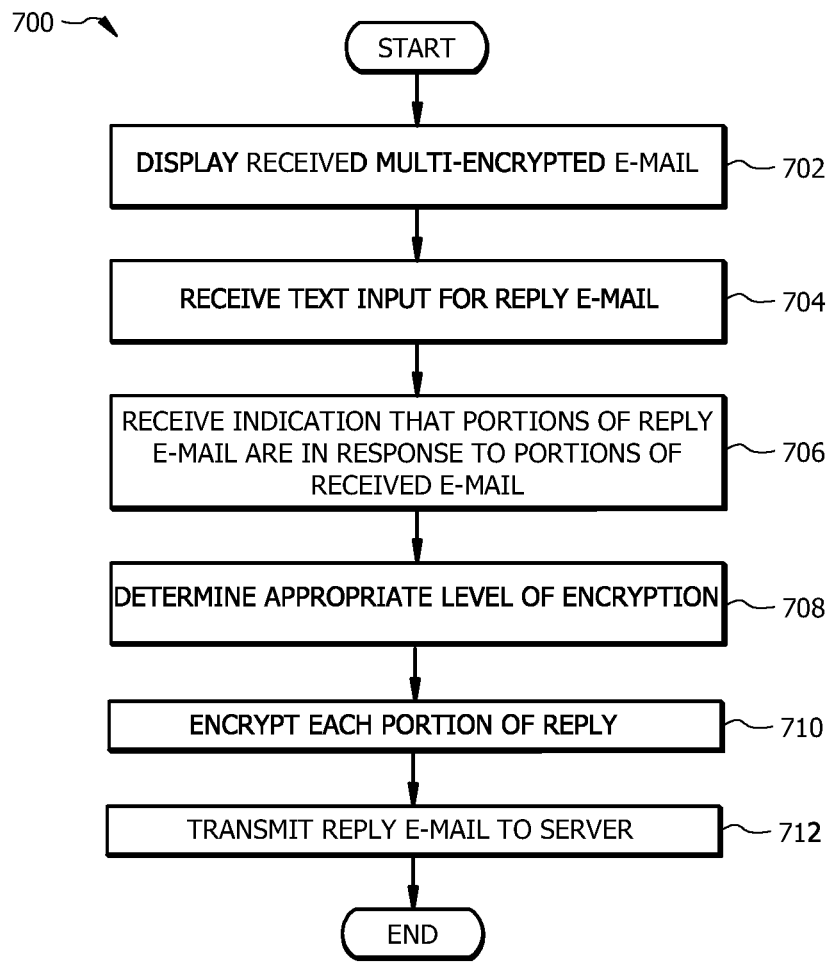
FIG. 7 is a flowchart of an embodiment of a method for generating a reply to a multi-encrypted email message.

FIG. 7 is a flowchart of an embodiment of a method 700 for generating a reply to a multi-encrypted email message. The method 700 starts at step 702 when an email client 146 presents an email with multiple levels of encryption in various portions of the message to a user. The email client 146 decrypts each portion using the appropriate encryption key 154.

Figure 8:
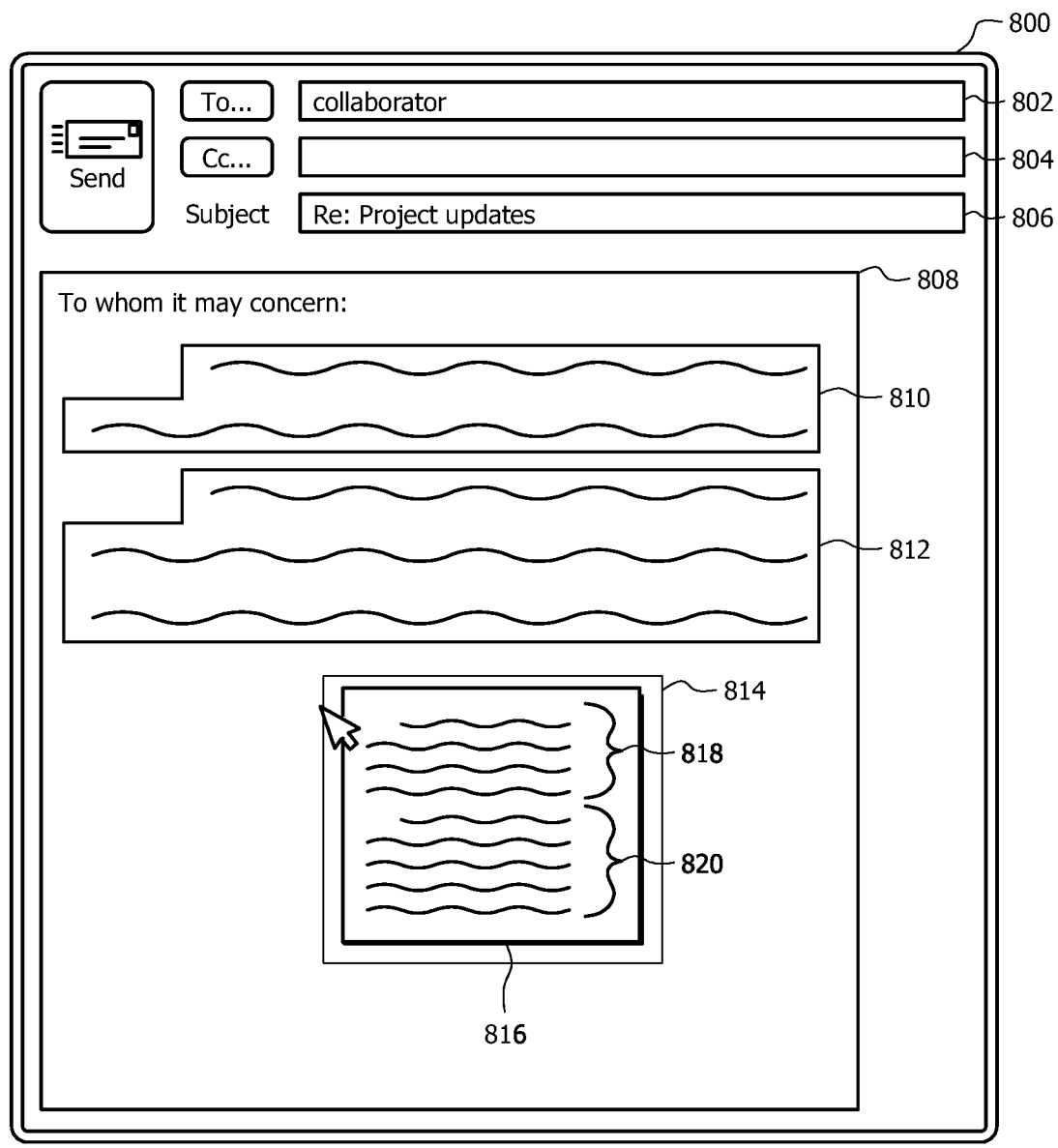
FIG. 8 is an embodiment of a reply to a multi-encrypted email message.

A decrypted email is illustrated in FIG. 6. To start a reply message, the user would press the reply button 608 pictured in FIG. 6. This would open a new window where the user could draft a response. This new window is illustrated in FIG. 8. The reply message 800 in FIG. 8 includes a "To" field 802 where the user can input an email address for the party to which the user wants to send a reply. The reply message 800 also includes a "carbon copy" field 804 like the "carbon copy" field 406 illustrated in FIG. 4. The reply message 800 further includes a subject field 806. Reply message 800 also includes a text field 808 where the user may draft a reply message.

Returning to FIG. 7, at step 704 the email client 146 receives the text input in text field 808. This text constitutes the reply message. After the text is generated in text field 808, the method 700 proceeds to step 706 where an indication is received that portions of the reply message are in response to specific portions of the multi-encrypted message received from the mail server 102. This process may be illustrated with reference to FIG. 8. The reply message 800 in FIG. 8 includes paragraphs 810 and 812 in the text field 808. The user may highlight a portion of the text, for example paragraph 812, and right click the highlighted text to open a drop-down menu 814. The drop-down menu 814 displays a miniature version of a received multi-encrypted message 816. The received multi-encrypted message 816 comprises a paragraph 818 and a paragraph 820. Paragraph 818 has a first level of encryption and paragraph 820 has a second level of encryption. The paragraphs 816 and 818 displayed in drop-down menu 814 are selectable. By selecting one of them, the user indicates that the highlighted text is in response to that section of the received multi-encrypted message 816. The user may perform this task for each section of the reply message drafted in text field 808. For example, the user might assign paragraph 810 as a response to paragraph 820, and paragraph 812 as a response to paragraph 818.

After the portions of the reply message are designated as responses to portions of the received multi-encrypted message, the method 700 of FIG. 7 proceeds to step 708. Step 708 involves determining the appropriate level of encryption to apply to each portion of the reply message. The encryption mapping engine 150 first determines the appropriate level of encryption. In the example of FIG. 8, the encryption mapping engine can recognize that paragraph 818 is of a first encryption level and that paragraph 820 is of a second encryption level. The encryption mapping engine 150 then searches the encryption keys 154 for the key that matches the level of encryption.

Once the proper encryption key 154 is identified, the method 700 proceeds to step 710 where each portion of the reply message is encrypted with the appropriate key. In this example, the paragraph 810 is encrypted with the encryption key 154 corresponding to the second encryption level, and paragraph 812 is encrypted with the encryption key 154 corresponding to the first encryption level. The same cipher that was used to encrypt the received multi-encrypted message is used to encrypt the reply message. As mentioned above, the encryption keys used in the described embodiments are symmetric, but the disclosed methods may also employ asymmetrical-key algorithms.

Finally, after encryption is complete, the method 700 proceeds to step 712 where the response engine 142 transmits the reply message to a mail server 102 for ultimate distribution to the intended recipients. Generation of individual instances of the reply message for each recipient, along with masking where appropriate, occurs at the mail server 102 as described in the section on mail server handling of multi-encrypted messages.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for generating an encrypted email message, comprising:
 a first memory configured to store:
  a first encryption key unique to a first class of users;
  a second encryption key unique to a second class of users, the second class of users being a subset of the first class of users;
  a third encryption key unique to a third class of users, the third class of users being a subset of the first class of users that is different from the second class of users;
 a first hardware processor operably coupled with the first memory, and configured to:
  construct an email message that is addressed to a plurality of recipients, comprising:
   a first portion of the message that is designated to be viewable by a portion of the plurality of recipients, wherein each of the recipients is in the first class of users;
   a second portion of the message that is designated to only be viewable by a first recipient from among the plurality of recipients, wherein the first recipient is in the second class of users; and
   a third portion of the message that is designated to only be viewable by a second recipient from among the plurality of recipients, wherein the second recipient is in the third class of users;
  apply a cipher, using the first encryption key that is unique to the first class of users, to the first portion of the email message to generate a first encrypted portion of the email message;
  apply the cipher, using the second encryption key that is unique to the second class of users, to the second portion of the email message to generate a second encrypted portion of the email message;
  apply the cipher, using the third encryption key that is unique to the third class of users, to the third portion of the email message to generate a third encrypted portion of the email message;
  transmit the email message to a server;
 the server, comprising:
  a second memory configured to store instructions for masking portions of an email using masking rules comprising either or both of blackout bars and blurred text; and
  a second hardware processor operably coupled with the second memory, and configured to:
   generate separate instances of the email message with each instance associated with different levels of encryption, comprising:
    generate a first instance of the email message having the first encrypted portion associated with a public encryption level to be sent to the portion of the plurality of recipients, wherein the first recipient and the second recipient are not among the portion of the plurality of recipients, where the first instance of the email message further having the second encrypted portion and the third encrypted portion that are masked or removed;
    generate a second instance of the email message having the first encrypted portion associated with the public encryption level and the second encrypted portion associated with a first private encryption level to be sent only to the first recipient, wherein the second instance masks, according to the masking rules, portions of the email message that are not intended for the first recipient, wherein the second instance of the email message further having the third encrypted portion that is masked or removed; and
    generate a third instance of the email message having the first encrypted portion associated with the public encryption level and the third encrypted portion associated with a second private encryption level to be sent only to the second recipient, wherein the third instance masks, according to the masking rules, portions of the email message that are not intended for the second recipient, wherein the third instance of the email message further having the second encrypted portion that is masked or removed;
transmit the first instance of the email message to the portion of the plurality of recipients;
transmit the second instance of the email message to the first recipient; and
transmit the third instance of the email message to the second recipient; and
a third hardware processor communicatively coupled with the first memory, the first hardware processor, and the second hardware processor, the third hardware processor is associated with the first recipient, the third hardware processor is configured to:
receive the second instance of the email message;
decrypt the first encrypted portion of the second instance of the email message using the first encryption key;
decrypt the second encrypted portion of the second instance of the email message using the second encryption key;
construct a reply message to the second instance of the email message, comprising:
receive a first input that indicates that a first portion of the reply message is a response to the first decrypted portion of the second instance of the email message, wherein the first input is received when the first decrypted portion of the second instance of the email message is selected on a drop-down menu, the drop-down menu shows a miniaturized version of the received first and second decrypted portions of the second instance of the email message, the drop-down menu is opened in response to the first portion of the reply message being highlighted;
in response to the first input, encrypt the first portion of the reply message with the first encryption key in response to the first encrypted portion of the second instance of the email message being associated with the public encryption level;
receive a third input that indicates that a second portion of the reply message is a response to the second decrypted portion of the second instance of the email message, wherein the third input is received when the second portion of the reply message being highlighted and the second decrypted portion of the second instance of the email message is selected on the drop-down menu;
in response to the third input, encrypt the second portion of the reply message with the second encryption key in response to the second encrypted portion of the email message being associated with the first private encryption level;
receive a fourth input that indicates a fourth recipient of the reply message; and
transmit the reply message to the fourth recipient.

2. The system of claim 1, wherein the first hardware processor is further configured to receive an input designating:
the first portion of the email message as viewable by the portion of the plurality of recipients;
the second portion of the email message as viewable by the first recipient from among the plurality of recipients; and
the third portion of the email message as viewable by the second recipient from among the plurality of recipients.

3. The system of claim 2, wherein:
the input comprises selections made from a list of recipients in a second drop-down menu; and
the second drop-down menu comprises a plurality of selectable option fields.

4. The system of claim 2, wherein the input comprises highlighting text in the email message.

5. The system of claim 1, wherein the cipher is a block cipher.

6. The system of claim 1, wherein the second hardware processor is further configured to:
cause the text in the first encrypted portion of the first instance of the message to appear in a first format on a display;
cause the text in the second encrypted portion of the second instance of the message to appear in a second format on the display; and
cause the text in the third encrypted portion of the third instance of the message to appear in a third format on the display.

7. The system of claim 6, wherein:
the first format comprises a first text color;
the second format comprises a second text color; and
the third format comprises a third text color.

8. A method for generating an encrypted email message, comprising:
constructing by a first processor, an email message that is addressed to a plurality of recipients, comprising:
a first portion of the message that is designated to be viewable by a portion of the plurality of recipients, wherein each of the recipients is in a first class of users;
a second portion of the message that is designated to only be viewable by a first recipient from among the plurality of recipients, wherein the first recipient is in a second class of users; and
a third portion of the message that is designated for to only be viewable by a second recipient from among the plurality of recipients, wherein the second recipient is in a third class of users;
applying, by the first processor, a cipher, using a first encryption key that is unique to the first class of users, to the first portion of the email message to generate a first encrypted portion of the email message;
applying, by the first processor, the cipher, using a second encryption key that is unique to the second class of users, to the second portion of the email message to generate a second encrypted portion of the email message; and
applying, by the first processor, the cipher, using a third encryption key that is unique to the third class of users, to the third portion of the email message to generate a third encrypted portion of the email message;
transmitting, by the first processor, the email message to a server;
generating, by a second processor associated with the server, separate instances of the email message with each instance associated with different levels of encryption, comprising:
generate a first instance of the email message having the first encrypted portion associated with a public encryption level to be sent to the portion of the plurality of recipients, wherein the first recipient and the second recipient are not among the portion of the plurality of recipients, where the first instance of the email message further having the second encrypted portion and the third encrypted portion that are masked or removed;

generate a second instance of the email message having the first encrypted portion associated with the public encryption level and the second encrypted portion associated with a first private encryption level to be sent only to the first recipient, wherein the second instance masks, according to masking rules, portions of the email message that are not intended for the first recipient, wherein the second instance of the email message further having the third encrypted portion that is masked or removed; and generate a third instance of the email message having the first encrypted portion associated with the public encryption level and the third encrypted portion associated with a second private encryption level to be sent only to the second recipient, wherein the third instance masks, according to the masking rules, portions of the email message that are not intended for the second recipient, wherein the third instance of the email message further having the second encrypted portion that is masked or removed;

transmitting, by the second processor, the first instance of the email message to the portion of the plurality of recipients;

transmitting, by the second processor, the second instance of the email message to the first recipient;

transmitting, by the second processor, the third instance of the email message to the second recipient;

receiving, by a third processor, the second instance of the email message;

decrypting, by the third processor, the first encrypted portion of the second instance of the email message using the first encryption key;

decrypting, by the third processor, the second encrypted portion of the second instance of the email message using the second encryption key;

constructing, by the third processor, a reply message to the second instance of the email message, comprising:

receiving a first input that indicates that a first portion of the reply message is a response to the first decrypted portion of the second instance of the email message, wherein the first input is received when the first decrypted portion of the second instance of the email message is selected on a drop-down menu, the drop-down menu shows a miniaturized version of the received first and second decrypted portions of the second instance of the email message, the drop-down menu is opened in response to the first portion of the reply message being highlighted;

in response to the first input, encrypting the first portion of the reply message with the first encryption key in response to the first encrypted portion of the second instance of the email message being associated with the public encryption level;

receiving a third input that indicates that a second portion of the reply message is a response to the second decrypted portion of the second instance of the email message, wherein the third input is received when the second portion of the reply message being highlighted and the second decrypted portion of the second instance of the email message is selected on the drop-down menu;

in response to the third input, encrypting the second portion of the reply message with the second encryption key in response to the second encrypted portion of the email message being associated with the first private encryption level;

receiving a fourth input that indicates a fourth recipient of the reply message; and transmitting, by the third processor, the reply message to the fourth recipient.

9. The method of claim 8, further comprising receiving, by the first processor, an input designating:

the first portion of the email message as viewable by the portion of the plurality of recipients;

the second portion of the email message as viewable by the first recipient from among the plurality of recipients; and the third portion of the email message as viewable by the second recipient from among the plurality of recipients.

10. The method of claim 9, wherein:

the input comprises selections made from a list of recipients in a second drop-down menu; and the second drop-down menu comprises a plurality of selectable option fields.

11. The method of claim 9, wherein the input comprises highlighting text in the email message.

12. The method of claim 8, further comprising:

causing, by the first processor, the text in the first encrypted portion of the first instance of the message to appear in a first format on a display;

causing, by the first processor, the text in the second encrypted portion of the second instance of the message to appear in a second format on the display; and causing, by the first processor, the text in the third encrypted portion of the second instance of the message to appear in a third format on the display.

13. The method of claim 12, wherein:

the first format comprises a first text color;

the second format comprises a second text color; and the third format comprises a third text color.

14. The method of claim 8, wherein the cipher is a block cipher.

15. A non-transitory computer readable medium storing executable instructions that when executed by a set of processors causes the set of processors to:

construct, by a first processor from among the set of processors, an email message that is addressed to a plurality of recipients, comprising:

a first portion of the message that is designated to be viewable by a portion of the plurality of recipients, wherein each of the recipients is in a first class of users;

a second portion of the message that is designated to only be viewable by a first recipient from among the plurality of recipients, wherein the first recipient is in a second class of users; and a third portion of the message that is designated for to only be viewable by a second recipient from among the plurality of recipients, wherein the second recipient is in a third class of users;

apply, by the first processor, a cipher, using a first encryption key that is unique to the first class of users, to the first portion of the email message to generate a first encrypted portion of the email message;

apply, by the first processor, the cipher, using a second encryption key that is unique to the second class of users, to the second portion of the email message to generate a second encrypted portion of the email message; and apply, by the first processor, the cipher, using a third encryption key that is unique to the third class of users, to the third portion of the email message to generate a third encrypted portion of the email message;

transmit, by the first processor, the email message to a server;

generate, by a second processor from among the set of processors, separate instances of the email message with each instance associated with different levels of encryption, comprising:
   generate a first instance of the email message having the first encrypted portion associated with a public encryption level to be sent to a portion of the plurality of recipients, wherein the first recipient and the second recipient are not among the portion of the plurality of recipients, where the first instance of the email message further having the second encrypted portion and the third encrypted portion that are masked or removed;
   generate a second instance of the email message having the first encrypted portion associated with the public encryption level and the second encrypted portion associated with a first private encryption level to be sent only to the first recipient, wherein the second instance masks, according to masking rules, portions of the email message that are not intended for the first recipient, wherein the second instance of the email message further having the third encrypted portion that is masked or removed; and
   generate a third instance of the email message having the first encrypted portion associated with the public encryption level and the third encrypted portion associated with a second private encryption level to be sent only to the second recipient, wherein the third instance masks, according to the masking rules, portions of the email message that are not intended for the second recipient, wherein the third instance of the email message further having the second encrypted portion that is masked or removed;
transmit, by the second processor, the first instance of the email message to the portion of the plurality of recipients;
transmit, by the second processor, the second instance of the email message to the first recipient; and
transmit, by the second processor, the third instance of the email message to the second recipient; and
receive, by a third processor from among the set of processors, the second instance of the email message;
decrypt, by the third processor, the first encrypted portion of the second instance of the email message using the first encryption key;
decrypt, by the third processor, the second encrypted portion of the second instance of the email message using the second encryption key;
construct, by the third processor, a reply message to the second instance of the email message, comprising:
   receive a first input that indicates that a first portion of the reply message is a response to the first decrypted portion of the second instance of the email message, wherein the first input is received when the first decrypted portion of the second instance of the email message is selected on a drop-down menu, the drop-down menu shows a miniaturized version of the received first and second decrypted portions of the second instance of the email message, the drop-down menu is opened in response to the first portion of the reply message being highlighted;
   in response to the first input, encrypt the first portion of the reply message with the first encryption key in response to the first encrypted portion of the second instance of the email message being associated with the public encryption level;
   receive a third input that indicates that a second portion of the reply message is a response to the second decrypted portion of the second instance of the email message, wherein the third input is received when the second portion of the reply message being highlighted and the second decrypted portion of the second instance of the email message is selected on the drop-down menu;
   in response to the third input, encrypt the second portion of the reply message with the second encryption key in response to the second encrypted portion of the email message being associated with the first private encryption level;
   receive a fourth input that indicates a fourth recipient of the reply message; and
transmit, by the third processor, the reply message to the fourth recipient.

16. The non-transitory computer readable medium of claim 15, further comprising instructions that when executed by the first processor cause the first processor to receive an input designating:
   the first portion of the email message as viewable by the portion of the plurality of recipients;
   the second portion of the email message as viewable by the first recipient from among the plurality of recipients; and
   the third portion of the email message as viewable by the second recipient from among the plurality of recipients.

17. The non-transitory computer readable medium of claim 16, wherein:
   the input comprises selections made from a list of recipients in a second drop-down menu; and
   the second drop-down menu comprises a plurality of selectable option fields.

18. The non-transitory computer readable medium of claim 16, wherein the input comprises highlighting text in the email message.

19. The non-transitory computer readable medium of claim 15, further comprising instructions that when executed by the first processor cause the first processor to:
   cause the text in the first encrypted portion of the first instance of the message to appear in a first format on a display;
   cause the text in the second encrypted portion of the second instance of the message to appear in a second format on the display; and
   cause the text in the third encrypted portion of the third instance of the message to appear in a third format on the display.

20. The non-transitory computer readable medium of claim 19, wherein:
   the first format comprises a first text color;
   the second format comprises a second text color; and
   the third format comprises a third text color.

* * * * *